Sept. 25, 1945.   W. W. MEYER   2,385,420
SEAL
Filed Dec. 7, 1942
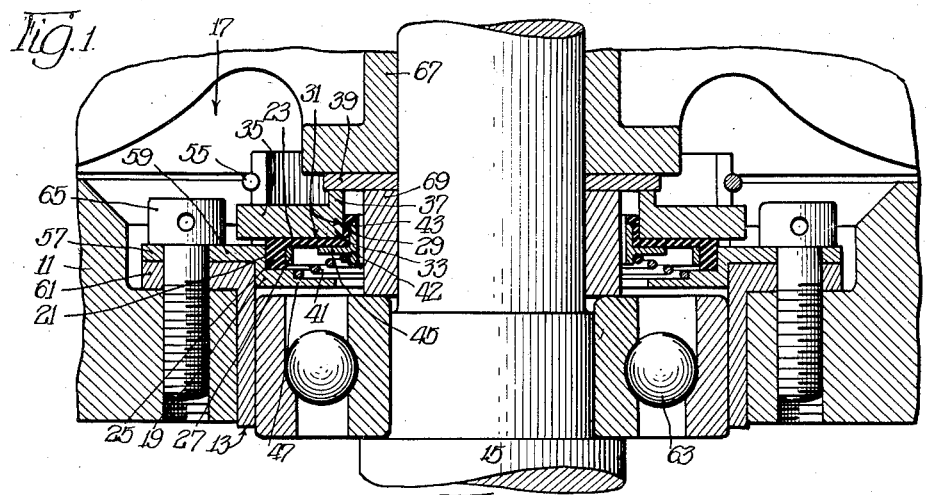
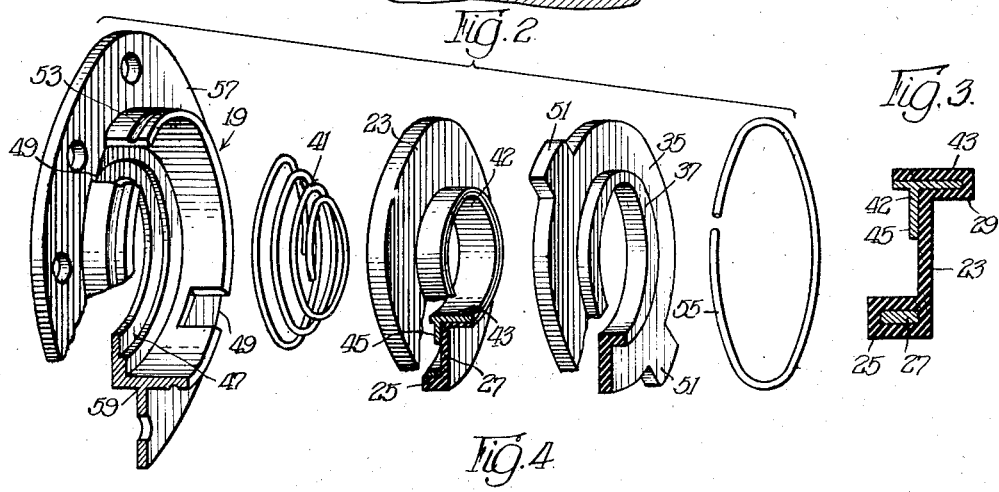
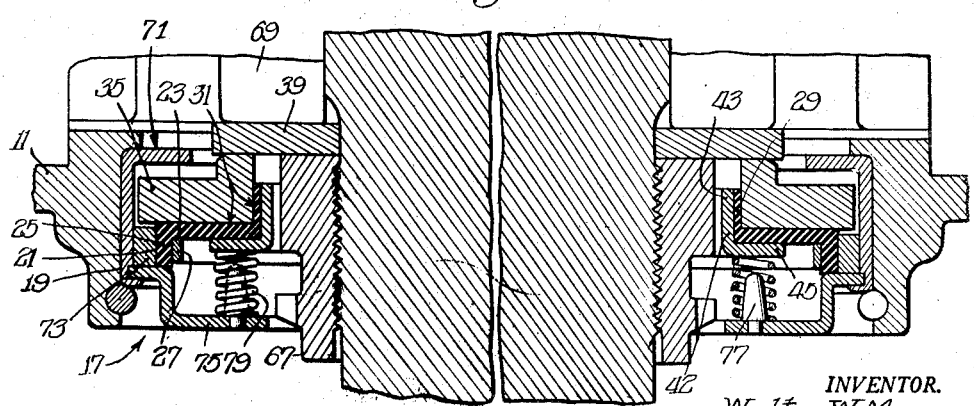
INVENTOR.
Walter W. Meyer,
BY
Spencer, Marzall, Johnston & Cook,
Attys.

Patented Sept. 25, 1945

2,385,420

UNITED STATES PATENT OFFICE 2,385,420

SEAL

Walter W. Meyer, Arlington Heights, Ill., assignor to Rotary Seal Company, Chicago, Ill., a corporation of Illinois Application December 7, 1942, Serial No. 468,070

11 Claims. (Cl. 286—11)

My invention relates in general to seals for rotating members, such as shafts, arbors and the like, and has more particular reference to sealing rotating members against fluid leakage along the member through a wall opening in which it extends.

An important object of the present invention is to provide improved means for sealing a rotating shaft or arbor to prevent escape of fluid along the shaft; a further object being to provide a seal for shafts or arbors which rotate at a high rate of speed.

Another important object is to provide a seal of the character mentioned embodying an annular sealing member of flexible rubber-like material supported in position on a mounting encircling the shaft and carrying a seal ring of bearing material adapted to form a running seal with a seat encircling the shaft, the flexible sealing member forming a diaphragm-like seal between the mounting and the ring.

Another important object is to reinforce the flexible member at or adjacent an edge thereof by vulcanizing the rubber-like material of the flexible member to a preferably metal reinforcing ring to form an annular rigidified seat on the flexible member for the tight reception of the seal ring carried thereby, while leaving portions of the flexible member, adjacent the reinforcing ring, free to flex in diaphragm fashion.

Another important object is to vulcanize a preferably metallic anchoring ring upon the rubber-like material of the flexible member in order to rigidify an annular portion thereof for snug reception in the mounting.

Another important object is to form the mounting as a housing in which the flexible gasket member as well as the sealing ring and a resilient seal urging spring are mounted and retained in position as an assembly unit; a further object being to provide simplified means for keying or splining the seal ring to the mounting to prevent relative rotation therebetween.

The foregoing and numerous other important objects, advantages, and inherent functions of the invention will be more fully understood from the following description, which, taken in connection with the accompanying drawing, discloses preferred embodiments of the invention.

Referring to the drawing:

Figure 1 is a sectional view taken through a seal structure embodying my present invention;

Figure 2 is an assembly view showing the several seal parts in perspective;

Figure 3 is a sectional view illustrating a modified gasket construction; and

Figure 4 is a sectional view through a seal embodying the present invention as embodied for application on shafts of large diameter.

To illustrate my present invention I have shown on the drawing a portion of a casing 11 having an opening 13 in and through which extends a shaft or arbor which is rotatable with respect to the casing 11, the important object of the invention being to provide means for sealing the opening 13 around the shaft to prevent the passage of fluid along the shaft through the opening. Heretofore seal structures for sealing wall openings around rotatable shafts or arbors have been proposed and successfully used where the speed of relative rotation between the shaft and the casing wall in which it is mounted is relatively low. Considerable difficulty, however, is experienced in attempting to seal shafts which necessarily operate at high speeds, such for example as the shafts of superchargers used as auxiliary equipment for aircraft engines. Seals of the kind heretofore provided and used on relatively slow speed shafts have been found to be unsatisfactory when applied to high speed shafts; and the seal of my present invention has been designed to provide adequate high speed shaft sealing.

In the drawing I have illustrated in Figures 1 and 2 a seal embodying the present invention as embodied for use as a replaceable unit on a shaft 15 of relatively small diameter, while in Figure 4 a seal embodying the present invention is illustrated as embodied for application on a shaft of relative large diameter.

In both embodiments the seal, designated generally by the numeral 17, comprises a support 19 in the form of a housing carrying the seal parts and adapted for assembly in position encircling the shaft, means being provided for sealingly securing the housing to the wall 11 at the opening 13. The housing 19 provides an annular seat 21 for receiving an edge of a flexible annular gasket 23 comprising resilient rubber-like material having an inner and an outer edge and which, due to the resilience of the rubber-like material employed, has the ability to flex and afford a diaphragm-like action in its portions intermediate the inner and outer edges thereof. One of the edges of the gasket member 23 is formed with an annular flange or bead portion 25 one side of which snugly and sealingly engages the frame seat 21, being held thereon by a preferably metallic retaining ring 27. The other edge of the gasket member 23 is formed with a flange or rib portion 29 which forms an annular seat 31 of angular sectional configuration sealingly engaging and receiving an annular shoulder 33 of angular sectional configuration which forms a portion of an annular seal ring 35 which in turn is mounted on and supported by the gasket member 23.

This seal ring 35 is formed with an annular portion 37 adapted to form a running seal with seat forming means 39 on the shaft 15.

The seal structure also includes spring means 41 mounted on the housing 19 in position to thrust the seal ring carrying portions of the gasket member 23 in a direction to press the said portions upon the shoulder 33 and to urge the ring 35 in a direction to engage the portion 37 thereof with the seat 39 to form a running seal therebetween. The portions of the gasket member 23 which sealingly engage the seal ring 35, which portions also receive the thrust of the spring 41, are rigidified and reinforced by an annular metal reinforcing ring 42 having a cylindrical portion 43 for rigidifying the flange 29 and a flange portion 45 overlying the body of the gasket member 23 at the base of the flange portion 29 to receive the thrust of the spring means 41.

It will be seen that the seal 17 accomplishes the sealing of the opening 13 around the shaft 15 by virtue of the running seal between the seat 39 and the sealing portion 37 of the ring 35; by virtue of the sealed mounting of the housing 19 on its support seat; by virtue of the resilient sealing effect accomplished between the gasket flange 25 and the housing seat 21 which receives it; and by virtue of the sealed connection between the shoulder 33 of the ring 35 and the gasket seat 31; the gasket portions extending between the seat 31 and the flange 25 being flexible to afford a diaphragm action whereby the ring 35 may at all times follow and tightly press upon the seat 39 regardless of any slight misalignment of the seat 39 with respect to the seal housing 19.

The efficiency of the seal depends to no small extent upon the arrangement of the parts forming the ring seat 31 in the gasket 23. By arranging these parts including the gasket flange 29 to lie upon a cylindrical surface portion of the seal ring 35 and by rigidifying said flange portion 29 by means of the ring member 42 an extended leakage resisting seal path is provided across the engaging portions of the gasket and ring 35, said engaging portions being indicated by the numeral 31 and its bifurcated arrowed lead line.

In order that the seal may have maximum effectiveness I prefer to form the gasket member 23 of rubber or rubber-like material which may be intimately adhered to the rigidifying ring 42 as by vulcanizing the same upon the ring at all interengaging surface portions. The flange portion 25 of the gasket is also preferably vulcanized upon and thus adhered intimately to its support ring 27 and if desired, the ring 27 may be imbedded in the flange portion 25 and the cylindrical portion 43 of the rigidifying ring 42 may likewise be imbedded in the gasket flange 29 as shown in Figure 3 of the drawing. To this end the rings 27 and 42 may conveniently be made of steel while the gasket 23 preferably comprises a synthetic rubber, such as Buna.

In order to obtain a tight bond of the gasket material on the steel members 27 and 42, the same are preferably formed with a rough surface finish which may be applied by using a rough, instead of smooth, finished coat in forming the surfaces of the rings to be adhered to the gasket material, or if the rings be formed as stampings, by stamping a desired rough pattern in the surfaces of the rings. The rings are then coated with a suitable synthetic rubber cement and deposited in a mold into which the gasket material is introduced and vulcanized to the rings under heat and pressure. As shown more particularly in Figure 3 of the drawing, the ring 27 may, if desired, be completely imbedded in the material forming the flange portion 25 of the gasket. The flange portion 43 of the ring 42 likewise may be imbedded in the gasket material in order to improve the vulcanized bond.

As shown in Figure 1, the housing member 19 comprises a preferably sheet metal shell of annular cup-shaped configuration, having a central opening for the reception of the shaft through the bottom of the cup-shaped shell, the gasket sealing shoulder 21 being formed on the bottom of the shell at the junction therewith of the annular side walls. Inwardly of the shoulder 21 the bottom of the shell is formed with a seat 47 for the reception of one end of the spring 41 which in the Figure 1 embodiment is a spiral-helical spring, the coils of which are adapted to compress in a common plane or zone in the interest of space economy.

The annular side walls of the housing are preferably provided with diametrical openings 49 for the reception of diametrically disposed and radially extending tongues 51 formed at the margin of the seal ring 35 whereby said ring 35 is free to move longitudinally in the housing 19 but is splined therewith against relative rotation. In order to prevent the seal ring 35 from escaping from the housing 19 through the open end thereof under the influence of the spring 41 prior to the assembly of the seal on the shaft 15, the cylindrical walls of the housing 19 are formed externally with an annular groove 53 near the open end of the housing, and a holding ring 55 of spring wire is snapped into and retained in the groove 53 in position to engage the ears 51 of the ring 35 and thereby retain the same in the housing.

The housing 19 also is formed with an outstanding mounting flange 57 which forms an angular seat 59 with the cylindrical walls of the housing adjacent the bottom thereof. The angular seat 59 is adapted to sealingly engage a cooperating seat formed on the wall 11 at the opening 13 to be sealed. As shown, the opening 13 is fitted with a mounting gland 61 forming a seat, the gland also serving as a mounting for a roller bearing 63 for journaling the shaft 15 within the opening 13. The seal housing 19 fits upon and into the seat afforded by the mounting gland 61 and is held in place by holding bolts 65 which penetrate the housing flange 57 and the seat forming flange of the gland 61.

In the illustrated embodiment shaft seat forming member 39 comprises a disk having a highly finished surface for receiving the annular portion 37 of the ring 35. This seat forming disk 39 may be secured on the shaft by clamping the same thereon between an annular clamping member 67 and a spacing ring 69, or the seat 39 may be formed on the shaft in any suitable or convenient fashion.

As shown in Figure 4, the housing 19 comprises an annular cup-shaped shell member 71 having an opening in its bottom through which the annular portion 37 of the ring 35 projects. The open end of the shell 71 is fitted with a ring 73 which forms the gasket receiving shoulder 21, the ring being held in place by means of a cover disk 75, the edges of which are secured to the open end of the shell 71 as by peening or otherwise. The cover disk 75 has a central opening for receiving the shaft and carries spring supporting pins 77 mounted thereon in spaced relationship around the shaft receiving opening of the cover disk 75. Each of the pins 77 supports a helical spring 79 forming the spring means 41, the individual springs 79 bearing at one end on the cover disk and at the other end on the flange portion 45 of the gasket support ring 42.

It will be seen from the foregoing that the rigidifying ring 42 provides angularly disposed flanges 43 supporting the flange portion 29 of the gasket 23 in position sealingly to receive the ring 35 along sealing surfaces 31 comprising intersecting planes, thereby providing adequate high speed shaft sealing. The ring 27 likewise maintains tight sealing between the gasket flange 25 and its supporting shoulder 21 while the gasket portions between the flanges 25 and 29 are free to flex so that under the influence of the spring means 41 the seal ring 35 may at all times be pressed tightly upon the seal member 39 without interfering with the sealing effect accomplished at the housing anchored portion 25 of the gasket.

Seals embodying the foregoing features have been used successfully in superchargers and other high speed equipment for the purpose of affording absolute sealage against liquid leakage along the shaft under pressure throughout extended service life; in fact superchargers fitted with the seal of my present invention now no longer are subject to leakage defects but the seals generally outlast the supercharger.

It is thought that the invention and its numerous attendant advantages will be fully understood from the foregoing description, and it is obvious that changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A seal assembly for use between relatively rotating parts one of which provides a seal seat, said seal assembly comprising a housing adapted to be secured to the other of said parts, a seal ring in the housing and adapted for sealing engagement with the seal seat and having a central opening to accommodate one of said parts, a flat rubber-like disk arranged between the housing and the seal ring, a peripheral flange on one side of said disk and having face and edge contacting engagement with the housing, a cylindrical flange extending on the other side of said disk and defining a central opening therein, said cylindrical flange having contacting engagement with the edge of the ring defining the central opening in the ring, coil spring means within the housing normally urging the cylindrical flange of said disk and said seal ring longitudinally in said housing to press the ring against the seal seat, and stop means on the housing in position to engage and limit the movement of the seal ring with respect to the housing under the influence of said spring.

2. A seal assembly for use between relatively rotating parts, one of which provides a seal seat, said seal assembly comprising a housing adapted to be secured to the other of said parts, a seal ring in the housing and adapted for sealing engagement with the seal seat and having a central opening to accommodate one of said parts, a disc of rubber-like material disposed between the housing and the seal ring, a peripheral flange on one side of said disc and sealingly engaging the housing, a cylindrical flange extending on the other side of said disc, and sealingly engaging the surfaces of said ring defining the central opening therein, spring means within the housing and normally urging said disc adjacent its cylindrical flange and said seal ring longitudinally in said housing to press the ring against the seal seat, said housing being formed with a longitudinal slot, said seal ring being formed with a projecting finger extending in said slot, and stop means comprising a spring wire mounted on the housing and extending across said slot in position to engage and limit the movement of said finger longitudinally in said slot under the influence of said spring means.

3. A seal assembly for use between relatively rotating parts, one of which provides a seal seat, said seal assembly comprising a housing adapted to be secured to the other of said parts, a seal ring in the housing and adapted for sealing engagement with the seal seat and having a central opening to accommodate one of said parts, a disc of rubber-like material disposed between the housing and the seal ring, a peripheral flange on one side of said disc and sealingly engaging the housing, a cylindrical flange extending on the other side of said disc and sealingly engaging the surfaces of said ring defining the central opening therein, spring means within the housing and normally urging said disc adjacent its cylindrical flange and said seal ring longitudinally in said housing to press the ring against the seal seat, and stop means on the housing comprising an inwardly extending annular flange formed on the housing in position to overlie the peripheral portions of said seal ring and limit the movement thereof with respect to the housing under the influence of said spring means.

4. A seal assembly for use between relatively rotating parts one of which provides a seal seat, said seal assembly comprising a housing adapted to be secured to the other of said parts, a seal ring in the housing and adapted for sealing engagement with the seal seat and having a central opening to accommodate one of said parts, a flat rubber-like disk arranged between the housing and the seal ring, a peripheral flange on one side of said disk and having face and edge contacting engagement with the housing, a cylindrical flange extending on the other side of said disk and defining a central opening therein, said cylindrical flange having contacting engagement with the edge of the ring defining the central opening in the ring, coil spring means within the housing normally urging the cylindrical flange of said disk and said seal ring longitudinally in said housing to press the ring against the seal seat, and stop means on the housing in position to engage and limit the movement of the seal ring with respect to the housing under the influence of said spring, and an angulated rigidifying collar member secured to said cylindrical flange.

5. A seal assembly for use between relatively rotating parts, one of which provides a seal seat, said seal assembly comprising a housing adapted to be secured to the other of said parts, a seal ring in the housing and adapted for sealing engagement with the seal seat and having a central opening to accommodate one of said parts, a disc of rubber-like material disposed between the housing and the seal ring, a peripheral flange on one side of said disc and sealingly engaging the housing, a cylindrical flange extending on the other side of said disc and sealingly engaging the surfaces of said ring defining the central opening therein, spring means within the housing and normally urging said disc adjacent its cylindrical flange and said seal ring longitudinally in said housing to press the ring against the seal seat, and an angulated rigidifying collar comprising a cylindrical neck imbedded in said cylindrical flange of the disk.

6. A seal assembly for use between relatively rotating parts one of which provides a seal seat, said seal assembly comprising a housing adapted to be secured to the other of said parts, a seal ring in the housing and adapted for sealing engagement with the seal seat and having a central opening to accommodate one of said parts, a flat rubber-like disk arranged between the housing and the seal ring, a peripheral flange on one side of said disk and having face and edge contacting engagement with the housing, a cylindrical flange extending on the other side of said disk and defining a central opening therein, said cylindrical flange having contacting engagement with the edge of the ring defining the central opening in the ring, coil spring means within the housing normally urging the cylindrical flange of said disk and said seal ring longitudinally in said housing to press the ring against the seal seat, and stop means on the housing in position to engage and limit the movement of the seal ring with respect to the housing under the influence of said spring, an angulated rigidifying collar member secured to said cylindrical flange, and a rigidifying ring secured to said peripheral flange.

7. A seal assembly for use between relatively rotating parts, one of which provides a seal seat, said seal assembly comprising a housing adapted to be secured to the other of said parts, a seal ring in the housing and adapted for sealing engagement with the seal seat and having a central opening to accommodate one of said parts, a disc of rubber-like material disposed between the housing and the seal ring, a peripheral flange on one side of said disc and sealingly engaging the housing, a cylindrical flange extending on the other side of said disc and sealingly engaging the surfaces of said ring defining the central opening therein, spring means within the housing and normally urging said disc adjacent its cylindrical flange and said seal ring longitudinally in said housing to press the ring against the seal seat, and a rigidifying ring of rectangular sectional configuration imbedded in the said peripheral flange of said disk.

8. A seal assembly for use between a stationary and a rotating machine part one of which affords a seal seat, said assembly serving to prevent fluid leakage between the said parts and comprising a housing adapted to be secured to the other part, a seal ring in the housing, an annular surface on the ring for running seal engagement with the seal seat, a disk of rubber-like material sealingly engaging said seal ring at a central opening in said disk, a peripheral annular projection on one side of the disk and having sealing engagement with the housing, a concentric annular projection on the other side of the disk at said central opening and having sealing engagement with the ring, coil spring means in the housing and pressing the disk adjacent the said central opening to normally urge the ring longitudinally, in a direction in the housing toward the sealed seat, means formed on the housing for retaining the ring, disk, and spring in the housing, and for limiting the movement of said ring in the housing.

9. A seal assembly for use between a stationary and a rotating machine part one of which affords a seal seat, said assembly serving to prevent fluid leakage between the said parts and comprising a housing adapted to be secured to the other part, a seal ring in the housing, an annular surface on the ring for running seal engagement with the seal seat, a disk of rubber-like material sealingly engaging said seal ring at a central opening in said disk, a peripheral annular projection on one side of the disk and having sealing engagement with the housing, a concentric annular projection on the other side of the disk at said central opening and having sealing engagement with the ring, coil spring means in the housing and pressing the disk adjacent the said central opening to normally urge the ring longitudinally, in a direction in the housing toward the sealed seat, means formed on the housing for retaining the ring, disk, and spring in the housing, and for limiting the movement of said ring in the housing, and ears on the ring having splined engagement with the housing to prevent rotation of the seal ring therein, while permitting longitudinal movement of the ring, with respect to the housing, under the influence of the spring.

10. A seal for relatively rotatable parts, one of which affords an annular seal seat comprising a housing adapted to be secured to the other of said parts, said housing providing an internal annular gasket seat therein and a spring seat inwardly of said gasket seat, a seal ring having a central opening defining a circular gasket engaging seat, a gasket in said housing comprising a disk of rubber-like material having a central opening, said gasket having an internal peripheral flange extending on one side of said disk, in position to snugly and sealingly engage in said gasket seat on the housing, and an internal cylindrical flange at said central opening of the disk, in position to snugly fit within and sealingly engage said gasket seat on the seal ring, a reinforcing collar having a neck extending within and sealingly secured to said cylindrical flange on the gasket to hold it against said gasket seat on the ring, and an integral flanged portion engaging the side of said disk opposite from said cylindrical flange at the base thereof, said cylindrical flange having an extension enclosing the end of the neck of said collar, remote from said flanged portion, said extension overlying and covering portions of the inner surfaces of said neck, whereby said neck is imbedded in said cylindrical flange, and spring means seated on said spring seat and pressing upon said flanged portion of the collar to normally urge the seal ring yieldingly in a direction in said housing to bear upon the seal seat.

11. A seal for relatively rotatable parts, one of which affords an annular seal seat comprising a housing adapted to be secured to the other of said parts, said housing providing an internal annular gasket seat therein and a spring seat inwardly of said gasket seat, a seal ring having a central opening defining a circular gasket engaging seat, a gasket in said housing comprising a disk of rubber-like material having a central opening, said gasket having an internal peripheral flange extending on one side of said disk, in position to snugly and sealingly engage in said gasket seat on the housing, and an internal cylindrical flange at said central opening of the disk, in position to snugly fit within and sealingly engage said gasket seat on the seal ring, a reinforcing collar having a neck extending within and sealingly secured to said cylindrical flange on the gasket to hold it against said gasket seat on the ring, and an integral flanged portion engaging the side of said disk opposite from said cylindrical flange at the base thereof, said collar having integral projecting means on said flanged portion of the collar and extending in a direction opposite from said neck in position forming a collar spring seat, a coil spring seated at one end in the spring seat on said housing and at the other end on the collar spring seat, whereby to urge the cylindrical flange of the gasket, and the seal ring thereon, in a direction to press the ring yieldingly against the cooperating seal seat.

WALTER W. MEYER.